V. D. CARROLL.
REGULATOR.
APPLICATION FILED AUG. 18, 1919.
1,384,554.
Patented July 12, 1921.
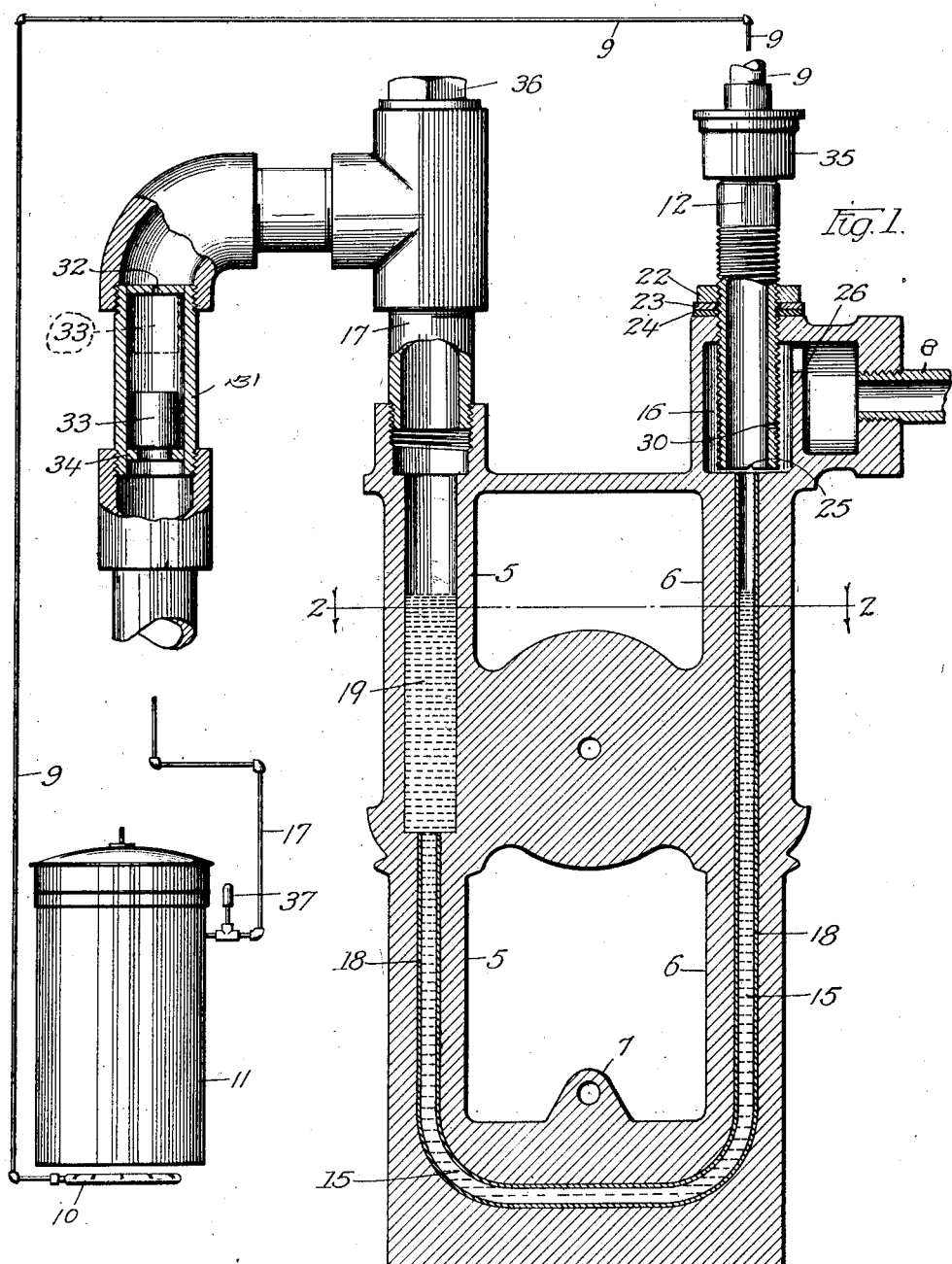
Inventor
Vincent D. Carroll
By: Foree Bain & Hinkle
Atty

UNITED STATES PATENT OFFICE.

VINCENT D. CARROLL, OF CHICAGO, ILLINOIS.

REGULATOR.

1,384,554.  Specification of Letters Patent.  Patented July 12, 1921.

Application filed August 18, 1919. Serial No. 318,355.

*To all whom it may concern:*

Be it known that I, VINCENT D. CARROLL, a citizen of the United States, residing at Chicago, in the county of Cook and State of Illinois, have invented certain new and useful Improvements in Regulators, of which the following is a specification.

This invention relates to regulators.

It relates particularly to regulators for controlling the supply of heating medium to a fluid heater and container.

An object of the present invention is to provide an improved regulator for controlling the supply of heating medium.

Another object is to provide a reliable, simple, inexpensive and compact regulator, which will automatically control the supply of heating medium in accordance with variations in the pressure within the container.

Another object is to provide an improved regulator which will conserve the expenditure of the heating medium.

Another object is to provide an improved regulator capable of ready and accurate adjustment to meet different service conditions.

Another object is to provide an improved regulator which may be readily applied to existing equipment of fluid heaters and containers.

Other objects and advantages will appear from the specification and claim.

In accordance with its preferred embodiment, the regulator comprehends a fluid controlled valve for regulating the supply of heating medium to the container, the fluid controlling the valve being affected by the pressure within the container so that when the pressure diminishes the valve opens and when the pressure increases the valve closes.

The accompanying drawing discloses, for the purpose of illustration and explanation, an embodiment of the invention particularly adapted to control the supply of gas to the burner of a water heater in accordance with the pressure within the heater.

In the drawings,

Figure 1 is a sectional elevation of the regulator, associated with a water heater which is shown in a reduced scale, and Fig. 2 is a section of the regulator on line 2—2 of Fig. 1.

The regulator has a supporting body of substantially U-shape with legs 5 and 6 and an interconnecting base 7. The body may be composed of suitable material, such as cast iron or cast steel. At the end of leg 6 is a gas inlet 8 and a gas outlet 9. Inlet 8 is connected to a suitable source of gas supply, and outlet 9 is connected to the gas burner 10 of a water heater and container 11. The outlet is shown throughout most of its length in a reduced scale, but it is to be understood that this is merely to facilitate illustration.

The regulator controls the flow of gas from inlet 8 through outlet 9 to burner 10, in accordance with the pressure within the container 11. The passage of gas is controlled by a valve located in the top of leg 6. This valve comprises a hollow valve stem 12, whose lower end is adapted to be opened and closed by liquid 15 in the leg 6 to regulate the gas to the burner. This opening and closing is accomplished by a liquid whose condition depends upon the pressure within container 11.

Within the regulator body is a substantially U-shaped chamber 15, opening at one end into a valve chamber 16, and at the other end into a pressure pipe 17, leading to the container 11. To condense the drawing a portion of pipe 17 is also shown in a reduced scale. Chamber 15 is lined throughout the greater portion of its length with a small metal tube 18, such as steel. The use of a steel tube allows the bore of the chamber to be smaller than could readily be provided by coring the body casting. The chamber is expanded at the end opposite the valve into a reservoir 19. The tube and reservoir are partly filled with a suitable fluid, such as mercury. The bore of tube 18 may be varied to suit the conditions of service. An opening with a diameter of about #18 B. & S. gage has been found to give excellent results in controlling a water heater.

Stem 12 is threaded through the top wall of valve chamber 16 and its lower end is adapted to seat against the bottom of the chamber or to be separated at any desired distance therefrom. The stem is held in the desired position by a lock nut 22, which, through a washer 23, presses a gasket 24 against the top of the valve chamber to provide a gas tight joint and a positive lock for the stem.

The passage of gas from inlet 8 to outlet 9 is regulated by the column of mercury in chamber 15, which upon rising in the right hand leg of the regulator, fills the lower part of the valve chamber to close the lower open end of the valve stem 12. The lower edge of the stem may be provided with a small tapered notch 25 to make the opening and closing of the stem more gradual, as the mercury falls and rises.

To prevent the mercury, which rises in the valve chamber from flowing through the outlet into the gas main, a dam 26 partly closes the valve chamber from the inlet, sufficient opening being left above the dam to allow the ready passage of gas.

Stem 12 is provided with a small opening 30 near the lower end, but above the level to which the mercury properly rises. This opening is to allow the passage of a small quantity of gas to keep the pilot light of burner 10, burning, even though the valve is closed by the rise of mercury.

Pipe 17 extends from the upper end of reservoir 19 into the container 11 above the normal level of the fluid being heated. The pipe is provided, at some point, between reservoir 19 and heater 11, with a chamber 31. This chamber is connected into the pipe by suitable couplings and has its upper end partly closed, a small opening 32 being provided for the passage of gas. The partly closed end of chamber 31 forms a valve seat for a small floating valve 33. Valve 33, which may be of cork or other suitable buoyant material, normally rests at the bottom of chamber 31 upon an inwardly projecting notched ring 34, as shown by the full lines of Fig. 1. In this position the pressure produced in container 11 is free to act upon the mercury in the regulator. However, if for any reason the container should be filled full of a liquid to be heated, this liquid rising in pipe 17 and chamber 31 raises valve 33 against its seat, as shown by the dotted lines, closing opening 32 to prevent the liquid from flowing into and mixing with the mercury in the regulator.

Valve stem 12 has a coupling 35 which allows the regulator to be readily connected in place in the gas line to the burner. A threaded opening in the upper end of leg 5 of the regulator body allows ready access to the regulator chamber for the purpose of inspection, cleaning and filling the tube with mercury. This opening is closed by a screw plug cap 32. A safety valve 37 may be provided in pipe 17, as an additional protection against excessive pressure in container 11.

The operation of the regulator is as follows: Assuming that heater and container 11 is partly filled with the liquid to be heated and that its temperature and pressure is below that at which the regulator is adjusted to interrupt the operation of the burner, the fuel flows from inlet 8, over dam 26, up through the opening in stem 12, through outlet 9, to burner 10. The burner heats the liquid in container 11 and as the temperature of the liquid rises, the pressure in the space above the liquid increases.

This pressure acts upon the column of mercury, through pipe 17 and chamber 31, against the weight of the mercury and the downward pressure of the gas from inlet 8, which presses upon the column of mercury through the right hand open end of chamber 15. As the pressure in the container increases, due to the rise in the temperature of the liquid therein, the column of mercury in the regulator chamber is pressed downwardly in the left hand leg and rises in the right hand leg. The mercury rises in valve chamber 16 above the lower open end of stem 12, closing the valve to shut off the supply of fuel to the burner. Because of the notch in the lower end of stem 12, this interruption of the gas supply is gradual. If the pressure and temperature in container 11 continues to rise, even with the diminishing fuel supply, the mercury rises to completely shut off the gas except for the minute amount which may pass through opening 30 to maintain the pilot light.

After the gas is shut off, the liquid in container 11 will cool, if the pilot is not sufficient to maintain it at the proper temperature. The decreasing temperature diminishes the pressure above the liquid and the column of mercury falls in the right hand leg of the regulator and rises in the left hand leg thereof. The lower end of stem 12 is thus gradually opened and the supply of fuel to the burner is resumed.

The point at which the regulator will act to interrupt and continue the supply of gas may be readily regulated by raising or lowering the open end of stem 12 by threading the stem out and in the valve chamber. The adjustment is maintained by lock nut 22.

Better results have been obtained by providing the mercury reservoir 19, since it allows a smaller movement of the column to furnish the necessary amount of mercury to properly fill the bottom of valve chamber 16.

If container 11 is overfilled with a liquid, the liquid rises in pipe 17 and chamber 31 and floats valve 33 upward to close opening 32. This valve then effectively separates the liquid from the mercury in the regulator chamber.

While one embodiment of the invention, particularly adapted to regulate the temperature and pressure in a water heater, has been shown and described, many modifications and other adaptations may be made to meet varying conditions in this and other fields of service.

Having described my invention, what I claim is:—

In combination with a pressure reducing liquid receptacle heated by a gas burner, of a gas controller therefor comprising a structure having a U-shaped conduit partially filled with mercury, the conduit extending part way down one leg on the pressure receiving side being much larger than the remainder of the conduit; a gas inlet pipe on the gas controlling side; an enlarged gas chamber between the gas inlet pipe and the gas controlling leg open at its top providing a dam, to prevent mercury from entering the gas inlet pipe; another chamber between the gas chamber and said leg; a vertically adjustable open tube extending into the latter chamber; a pipe extending therefrom to said burner; means to lock the vertically adjustable tube in adjusted position and a float valve to prevent overflow of water from said receptacle into the gas controlling device.

In testimony whereof I hereunto subscribe my name.

VINCENT D. CARROLL.